United States Patent
Cox et al.

(10) Patent No.: US 6,754,076 B2
(45) Date of Patent: Jun. 22, 2004

(54) STACKABLE LIQUID COOLING PUMP

(75) Inventors: William E. Cox, Lagrangeville, NY (US); Roger R. Schmidt, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 55 days.

(21) Appl. No.: 10/283,727

(22) Filed: Oct. 30, 2002

(65) Prior Publication Data

US 2004/0085732 A1 May 6, 2004

(51) Int. Cl.$^7$ .............................................. H05K 7/20
(52) U.S. Cl. ................. 361/699; 165/80.4; 174/15.1; 361/701; 361/702; 415/199.4; 415/199.5; 415/172.1; 415/200; 415/215.1
(58) Field of Search ................. 165/80.3, 80.4; 174/15.1; 361/689, 694–695, 698–702, 711; 415/170.1, 172.1, 174.2, 199.4, 199.5, 200, 173.1, 214.1, 215.1

(56) References Cited

U.S. PATENT DOCUMENTS

| | | | |
|---|---|---|---|
| 3,170,630 A | * | 2/1965 | Chadwick .................. 236/1 B |
| 4,590,538 A | * | 5/1986 | Cray, Jr. .................... 361/700 |
| 5,144,531 A | * | 9/1992 | Go et al. .................... 361/702 |
| 5,323,847 A | * | 6/1994 | Koizumi et al. ....... 165/104.33 |
| 5,338,164 A | | 8/1994 | Sutton et al. |
| 5,406,807 A | * | 4/1995 | Ashiwake et al. ............ 62/376 |
| 6,439,835 B1 | * | 8/2002 | Chien et al. ................ 415/104 |

* cited by examiner

Primary Examiner—Gregory D. Thompson
(74) Attorney, Agent, or Firm—Lawrence D. Cutter (57) ABSTRACT

Electronic system components are cooled using a field configurable pump comprising a selectable plurality of identical or nearly identical modular pump units. The pump units are disposed in a stacked arrangement and are fluidly connected to adjacent modular pump units via a removable coupling, preferably one of the quick-disconnect variety. Each modular pump unit comprises a housing, an impeller and a sealing mechanism. When disposed in a stack the combined pump structure is driven by a single motor. In this fashion, pump structures may be employed which are adaptable to heat flux demands imposed by the electronic components.

19 Claims, 6 Drawing Sheets

STACKABLE LIQUID COOLING PUMP

BACKGROUND OF THE INVENTION

The present invention is generally directed to coolant pumps employable in the cooling of electronic circuit components and modules. More particularly, the present invention is directed to an adaptable pump structure provided in modular form. Even more particularly, the present invention is directed to a stackable coolant pump in fluid connection with a liquid cooled cold plate which is in thermal contact with a circuit or module to be cooled.

The present invention is at least partially motivated by the fact that electronic circuit modules and other electrical components continue to dissipate increasingly larger amounts of thermal energy. For this reason, improved cooling technologies are highly desirable for carrying away this thermal energy. One method for cooling circuits employs a water cooling system in which a pump is used to convey water through a cold plate attached to an electronic module. In this approach heat is typically carried away to the ambient air through an air-to-water heat exchanger. This method is capable of handling relatively high heat fluxes occurring within the circuit modules.

Because of the above-mentioned higher circuit packaging densities and because of the desire to operate circuits, especially computer and communication circuits, at higher frequencies, power dissipation problems are now greater than ever and are expected to increase even more as both individual circuit elements and circuit chips are packed into smaller and smaller volumes. Because of this desire for packaging components in smaller volumes, the need for miniaturization also spills over into the design of any thermal energy dissipation system used to cool the electronics. Thus, because of the increased packaging density of the electronic components, miniaturized cooling system components are an equally strongly desired feature. Put another way, the goal of electronic circuit miniaturization would not be met by a system in which the electronic components were packaged as compactly as possible, but yet included unnecessarily large cooling system components which had not also been reduced in size by approximately the same scale factor.

One of the other factors that should be considered in pumps designed to provide cooling fluid for high thermal flux electronic circuit components is the ability to control the pump dimensions so as to be compatible with industry standard form factors, especially certain design height specifications. For example, the Electronic Industry Association (EIA) specifies a 1 U height of 1.75 inches for certain systems. Accordingly, a pump design should be scalable such that it is easy to maintain critical dimensioning so as to fit within these standard electronic packaging constraints. In particular, it is noted that the pump of the present invention is well able to fit within the 1 unit (1 U) EIA electronic package standard.

The present invention solves all of these problems above through the use of a liquid pump which provides high coolant flow rates and high coolant pressures. It provides this capability through the use of a modular and stackable pump structure which permits one to tailor the pump portion of the system to the thermal requirements of the electronic portion of the system without impacting important system dimensions. Moreover, the pump of the present invention is able to meet these goals and still meet the objective of providing miniaturized cooling system components, the key point here being that increased performance is achieved without increasing the overall size of the electronic package.

SUMMARY

In accordance with one embodiment of the present invention a field configurable fluid pump comprises a plurality of modular pump units. Each of the modular units has a fluid inlet port and a fluid outlet port and a set of rotatable fluid moving vanes disposed within a substantially central volume. The pump units are sealed, one against the other, by arranging them in a stack. The bottom of an upper unit provides a sealing boundary for containment of the cooling fluid. The top of a lower unit provides the other boundary and a seal structure. (However, it is noted that this arrangement may be reversed with a seal element being disposed instead in the upper unit.) This seal is provided to prevent leakage between stacked units. A drive shaft extends through the modular pump units and is connected so as to rotate the vanes which act to move fluid from respective ones of the inlet ports to respective ones of the outlet ports. At least one removable fluid coupling conduit extends from one of the outlet ports to the inlet port in an adjacently disposed pump unit in the stack. It is this coupling which serves to provide a fluid connection between the modular pump units in the stack. The removable nature of this connection is significant in terms of the ability to provide a stacked structure with an easily adapted number of modular units. A sealing member (flat plate or nonfunctioning module unit) is disposed against the uppermost modular pump unit in the stack to provide a fluid seal for the central volume in the top unit.

In accordance with another embodiment of the invention there is provided a modular pump unit which is capable of being disposed in a stack with other units to form a larger pump structure with an increased flow rate and an increase in coolant fluid pressure. These modules include a housing having a substantially centrally disposed opening or cavity on its top side. This opening is typically and preferably cylindrical and it defines (when mated in a stack) a fluid flow volume for the modular pump unit. The housing also includes an inlet port and an outlet port both of which are in fluid communication with this internal cavity. A set of rotatable vanes are mounted on a drive axle which extends through a sealed opening in the bottom of the fluid flow cavity. These vanes are rotatable within the fluid flow volume so as to move fluid from the inlet port to said outlet port. There is also a seal disposed on the top side (or bottom side) of the housing so as to be capable of forming a seal with other modular pump units when they are disposed in a stacked configuration.

In accordance with yet another embodiment of the invention there is provided a cooled electronic system in which the stackable or field configurable fluid pump of the present invention is employed in conjunction with a cold plate in thermal contact with the components to be cooled. The cold plate includes channels for the passage of cooling fluid. Fluid conduits connect the pump, the cold plate and air-to-fluid heat exchangers in a closed loop with the heat exchangers preferably being disposed immediately downstream of the pump.

Accordingly, it is an object of the present invention to provide a stackable, field configurable pump for cooling fluids.

It is also an object of the present invention to provide a fluid pump which is constructed from a plurality of common parts which thus reduces the cost of production.

It is a still further object of the present invention to provide a pump design structure wherein fluid pressure can be increased and especially wherein this pressure increase is produced in already existing pump units.

It is yet another object of the present invention to provide fluid pump structures which meet defined standard size requirements.

It is a further object of the present invention to provide a pump structure in which the designed for fluid flow rate can be adjusted by increasing the width of the impeller.

It is also an object of the present invention to provide a stackable pump structure in which fluid communications from one modular pump unit to the next pump unit is provided by snap-in-piping, such as through the use of piping which is sealed to the pump body with an O-ring or O-ring type seal.

It is a still further object of the present invention to provide a pump design which is scalable.

It is yet another object of the present invention to provide a modularly constructable pump whose dimensions are easily controllable so as to permit it to fit within spaces having predefined, standard height requirements.

It is also an object of the present invention to provide smooth transitions internal to the pump resulting in low pressure losses.

It is a further object of the present invention to provide a pump which can be driven by a motor of choice which also meets standard dimensional constraints.

It is yet another object of the present invention to provide a pump which is easily mountable in its designed-for environment.

It is also an object of the present invention to provide a pump which is simple to manufacture and which may be made from a wide variety of materials with at least some of these materials being selectable because of their machinability properties.

Lastly, but not limited hereto, it is an object of the present invention to increase the speed and packing density of electronic circuits by providing enhanced cooling systems which are dimensioned to be compatible with the circuit miniaturization which accompanies the increased packing densities.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
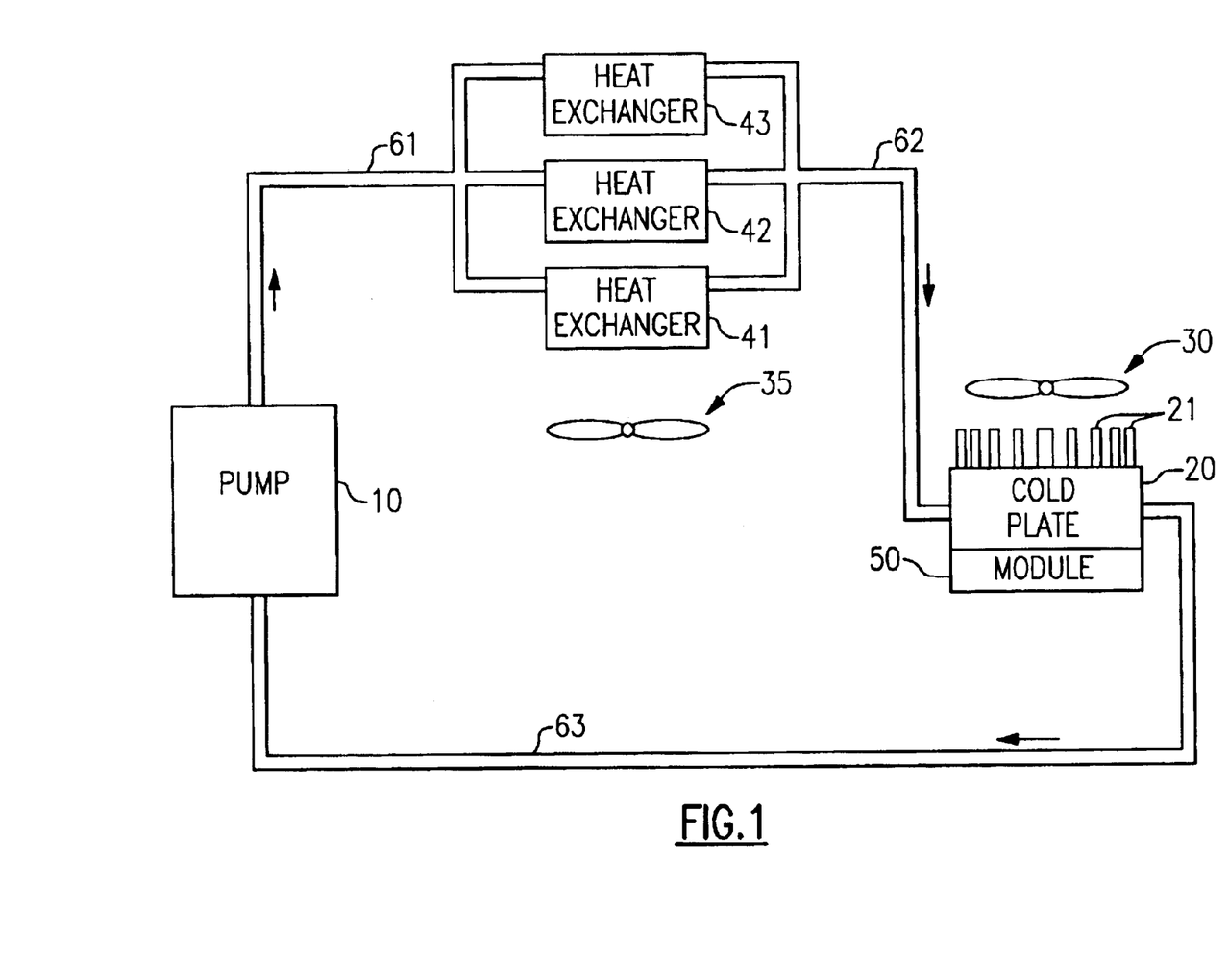
FIG. 1 is a block diagram of a cooling system of the type likely to employ the pump of the present invention.

FIG. 1 illustrates, in block diagram form, one embodiment of the present invention particularly as it relates to pump 10 whose details are provided below in conjunction with the discussion of the other figures. Pump 10 is provided to supply a flow of coolant fluid to cold plate 20 which is in thermal contact with electronic module 50. While particularly applicable to the cooling of electronic circuit components, it is noted that the pump of the present invention may be used to provide cooling fluid for the purpose of cooling almost anything. Furthermore, even though the present pump is particularly useful for providing flow pressure for coolants, the present invention is not so limited and in fact the pump herein may be usefully employed in any circumstances for which pumps in general are employed. The present pump is also not limited to applications involving miniature scale components.

In FIG. 1, pump 10 is in fluid communication with one or more heat exchangers 41, 42 and 43 through conduit or piping 61. In preferred embodiments of the present invention these heat exchangers are liquid-to-air heat exchange devices. Coolant leaves heat exchangers 41, 42 and 43 via conduit or piping 62 which is in fluid communication with cold plate 20. Cold plate 20, typically comprising a material such as copper or aluminum, includes passages therein for the cooling fluid. Cold plate 20 also preferably includes fins 21 to provide an additional direct air cooling function, if desired. This function is provided by air moving device 30, such as a fan. Cold plate 20 is in thermal contact with electronic circuit module 50. Cooling fluid exits cold plate 20 and returns to pump 10 via conduit or piping 63. Air moving device 35 may be additionally provided as a means for increasing the rate of flow of thermal energy from liquid within heat exchangers 41–43 to the surrounding air. As many heat exchangers as desired may be provided or, equally as well, a single heat exchanger may be provided which is sized appropriately for the thermal flux produced by module 50.

Figure 2:
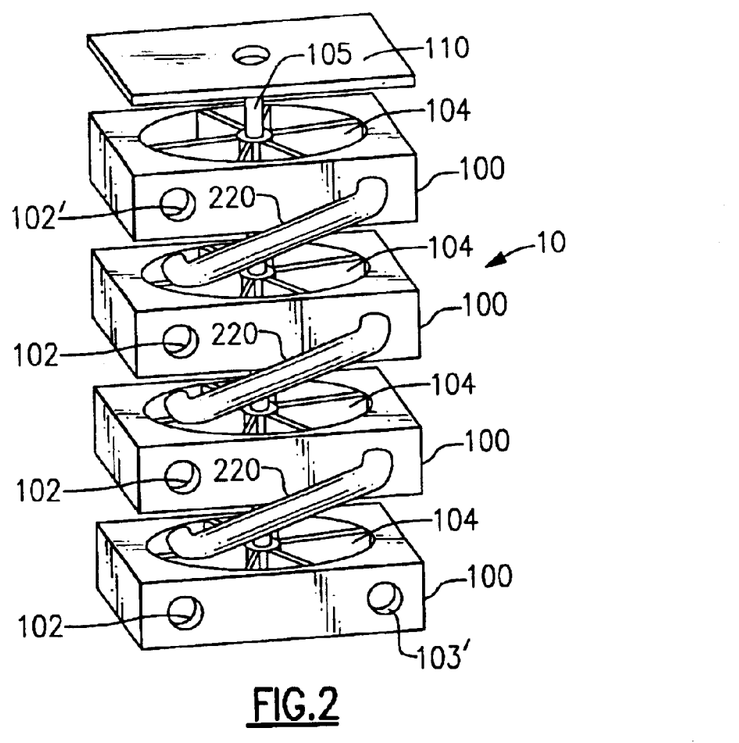
FIG. 2 is an isometric exploded view illustrating the assembly of a plurality of substantially identical building blocks into a single pump structure.

FIG. 2 illustrates the pump of the present invention shown in an exploded view which is particularly directed to demonstrating its stackability and modular aspects. Pump 10 is seen to be comprised of a plurality (here four, solely for the sake of example) of identical modular pump units 100. Each modular pump unit 100 includes an impeller comprising vanes 104 connected to central drive shaft 105. While the vanes shown in FIG. 2 are shown as being flat, it should be appreciated that any curved vane structure consistent with turbine pump functioning may be employed. Each unit 100 also includes inlet port 103 and outlet port 102. In FIG. 2, ports 102' and 103' are so designated to point out that these ports are in fact outlet and inlet ports for the overall pump structure, not just for the outlet and inlet ports, respectively, of individual modular pump units 100. Removable pipes or conduits 220 are employed to connect the outlet from a lower modular pump unit in the stack to the inlet of the modular pump unit above it in the stack. As many modular pump units as desired may be employed in the stack to meet the thermal flux removal requirements of module 50. To provide a sealed volume for the uppermost pump unit in the stack plate 110 is employed. In "emergency" situations it is also possible to employ a nonfunctioning modular pump unit in order to provide the sealing function of plate 110; however, this is not the preferred approach since it would mean that an extra set of impeller vanes would have to be rotated as well. It is also noted that the pump of the present invention is reversible and that the descriptions herein attached to inlet port and outlet port are interchangeable.

Figure 3:
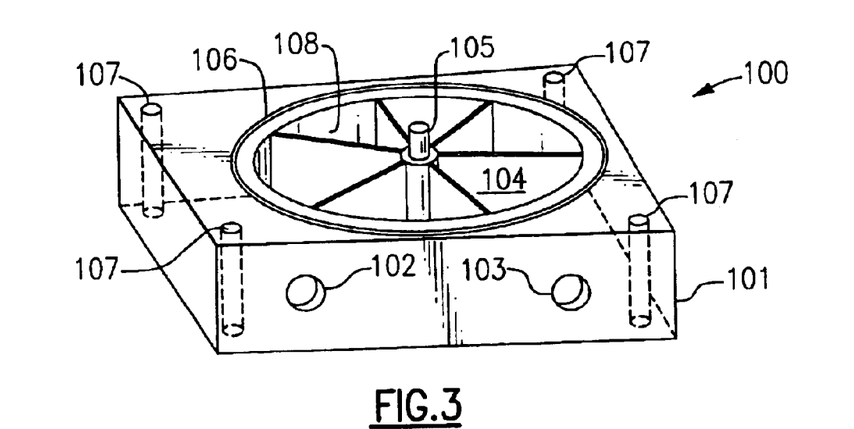
FIG. 3 is an isometric view illustrating the structure of a single component that can be assembled into a multiple component stack.

FIG. 3 provides a more detailed view of modular pump unit 100. In particular, it is seen that unit 100 includes channel or groove 106 in which an O-ring seal (not shown) is provided. FIG. 3 shows channel or groove 106 as being disposed in the top surface of modular pump unit 100. However, it is also possible to dispose this feature on the bottom of unit 100. It is also possible, using a slightly larger size O-ring (that is, larger in thickness) to provide matching channels or grooves on both the top and bottom surfaces of pump units 100.

FIG. 3 also illustrates the presence of holes 107 through which bolts are disposed for holding the modular pump units together in a sealed arrangement. All of the modular pump units may be constructed as shown in FIG. 3. However, it is noted that the bottom most unit may be provided with blind threaded openings for receipt of threaded bolts, so that, in effect the bottom most unit functions as a nut for bolts passing through openings 107. It is noted that while the above description considers nuts and bolts as a mechanism for providing a sealing function, any other convenient fastening mechanism may also be provided including clevis pins and clamping arrangements. The only requirement for such a mechanism is that it provide oppositely directed forces at the top and bottom portions of the stacked modular pump units.

Figure 4A:
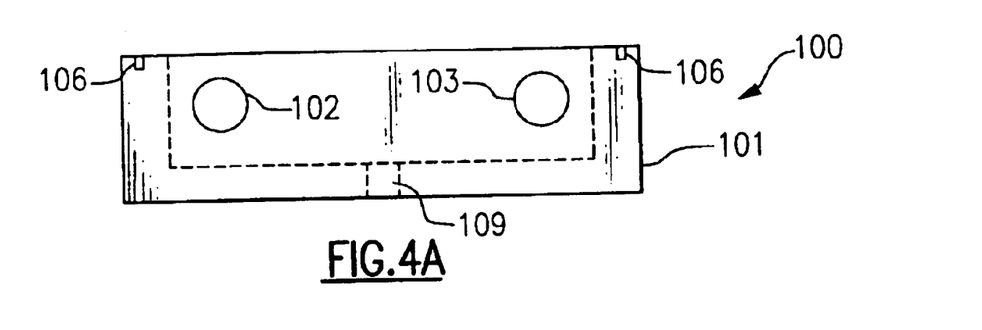
FIG. 4A is a side elevation view of the single component structure shown in FIG. 3.
Figure 4B:
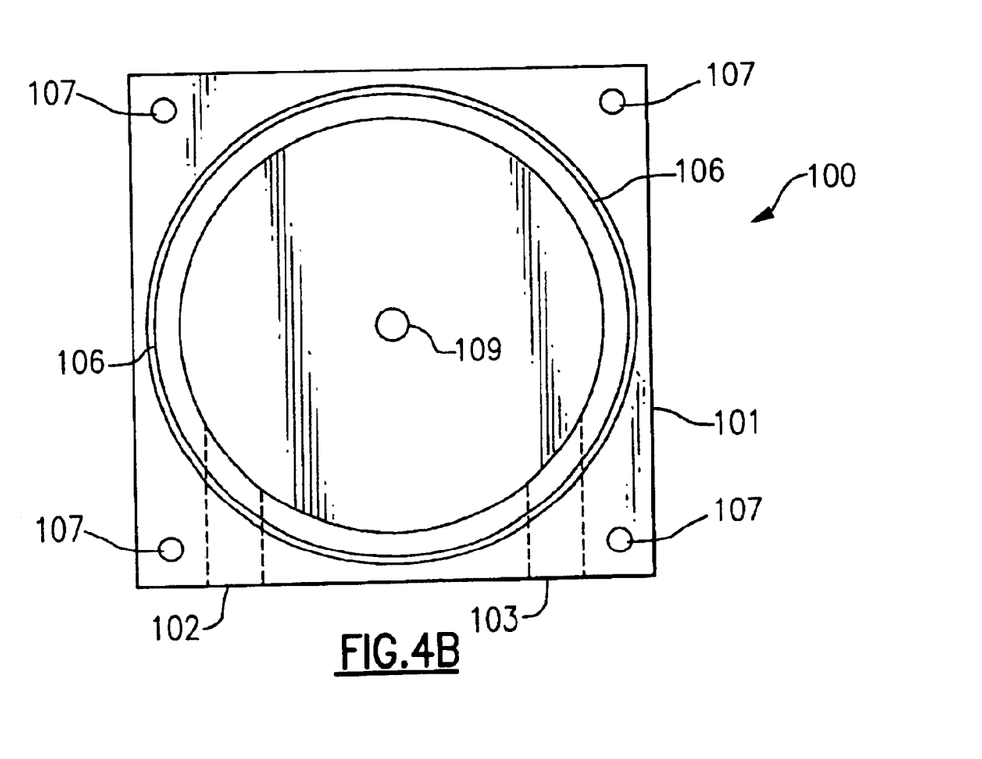
FIG. 4B is a top view of the same single component structure shown in FIG. 3 and in FIG. 4A.

FIG. 4A is a side elevation view of modular pump unit 100. In particular, it shows, in phantom view, the presence of shaft opening 109 in the bottom of the volume occupied by the impeller structure. The size of this volume is readily controlled by selectively machining or molding the opening in housing 101 for pump unit 100. Also shown in phantom view is channel or groove 106 for receiving an O-ring seal (not shown). FIG. 4B is similar to FIG. 4A except that a top view is shown. This view shows the preferred circular structure for channel or groove 106. Other closed loop shapes for this channel or groove may also be provided. Omitted from FIG. 4A, for reasons of clarity, are phantom lines for holes 107.

Figure 5:
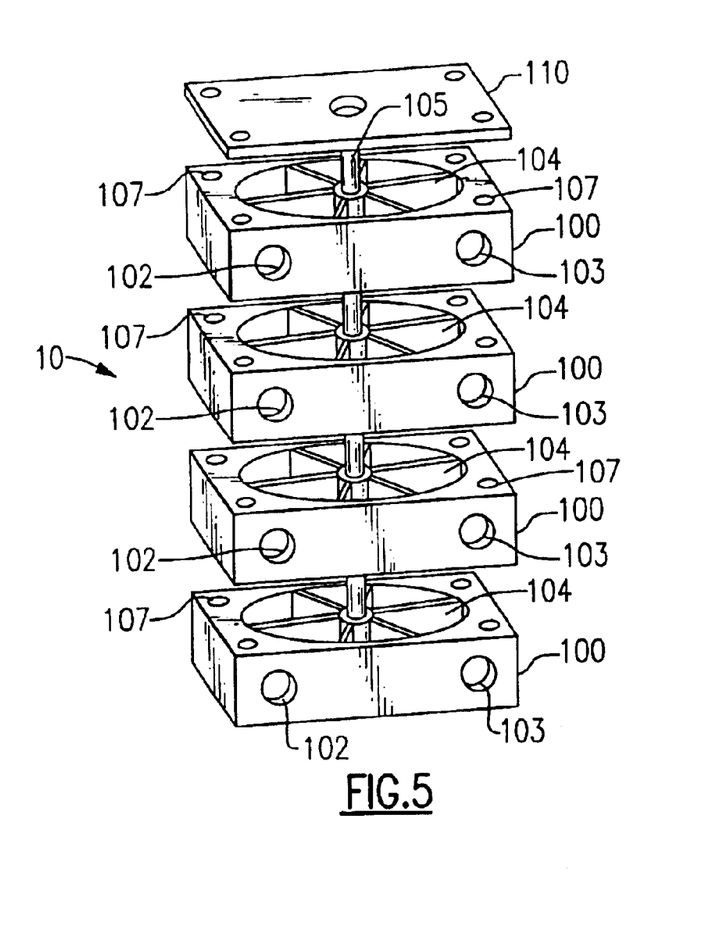
FIG. 5 is an exploded view similar to FIG. 2 but with fluid coupling conduits removed from the view to provide a better view of the stacking mechanism and procedure.
Figure 6:
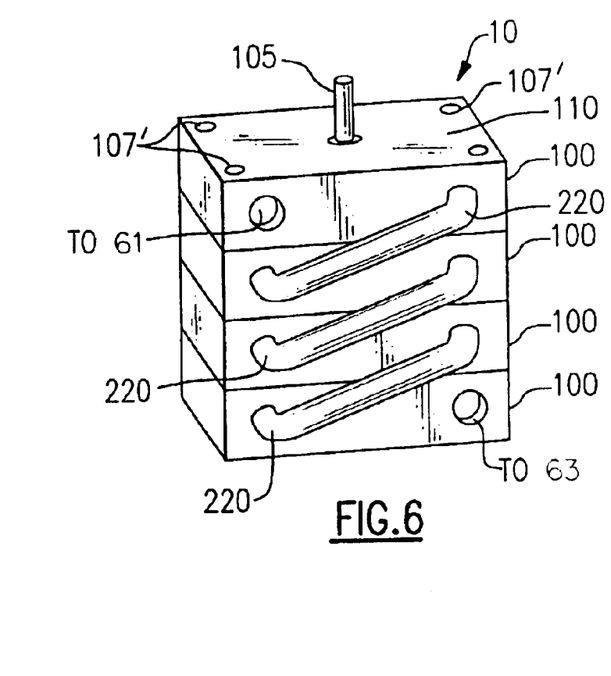
FIG. 6 is an isometric view showing an assembled stack with the stack components fluidly linked together.

FIG. 5 is a view similar to FIG. 2 except that conduits 220 are not shown so as to provide a clearer view of the modular pump stack. FIG. 6 is a view of a completely assembled pump with bolts 107' extending through holes 107 (no longer visible) and further including conduits 220 linking adjacent pump units in the stack. In particular, FIG. 6 also shows connections to conduits 63 and 61 in FIG. 1. FIG. 6 also illustrates shaft 106 extending through an opening in plate 110. In this regard, it is noted that the pump can be driven from either the top or from the bottom, whichever is mechanically more convenient in the particular application. Accordingly, it is not always necessary to have an opening in plate 110. While the modular pump structure of the present invention is preferably maintained in a sealably fixed stack by means of bolts, as shown, any convenient mechanism may be employed for this purpose including clamps and/or surrounding bands.

With respect to shaft 105 it is noted that there are two ways in which such a drive shaft can be provided. In a first embodiment shaft 105 comprises separately interlocking axles which are provided for the individual sets of vanes 104 in each modular pump unit. In this case the top of one axle mates in a rotationally locking arrangement (say, for example, via a spline fit, a key fit or any other convenient mechanism) with the bottom of the axle in the immediately adjacent pump unit. In a second embodiment, shaft 105 may be provided as an integral structure extending through centrally disposed openings in the axles. This is, however, not the preferred approach since one would either have to provide shafts of different lengths or would have to employ a pump structure with a shaft which extends beyond its useful length.

Figure 7:
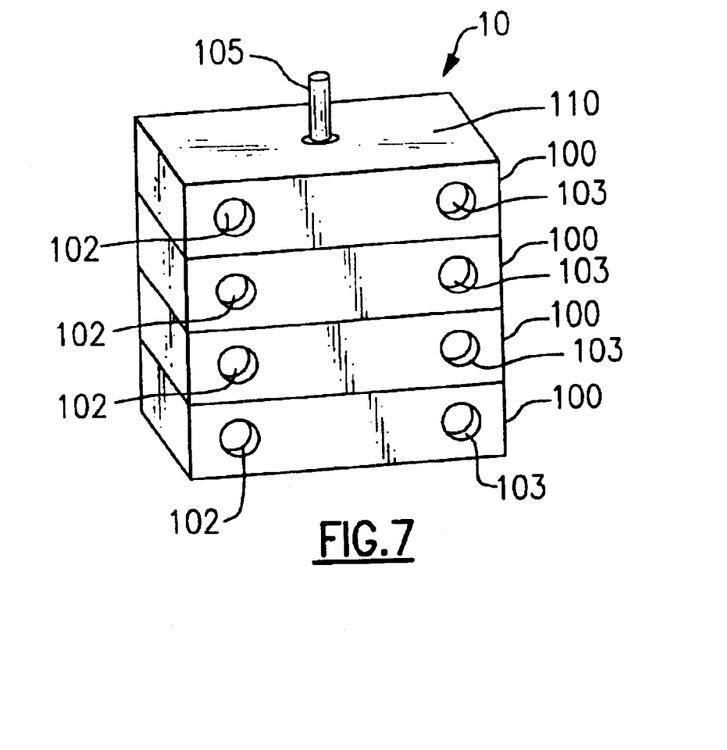
FIG. 7 is an isometric view similar to FIG. 6 prior to insertion of the fluid coupling links.
Figure 8:
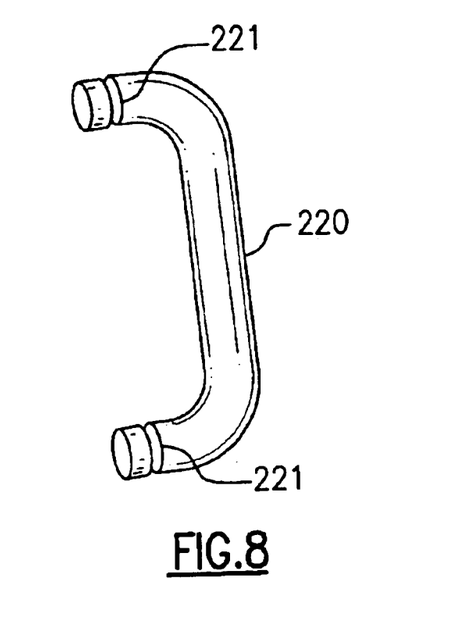
FIG. 8 is an isometric view illustrating one embodiment of one of the fluid coupling links.

FIG. 7 is a view similar to FIG. 6 except that conduits 220 are not shown. These conduits are instead shown in FIG. 8. In particular, FIG. 8 also illustrates the presence of seal or quick coupling connection 221. While FIG. 7 illustrates a preferred embodiment of the present invention, it is also noted that it is not an essential feature of the present invention that all of the inlet and outlet ports be located on the same side of either the individual modular pump units 100 or on the same side of the overall pump structure 10.

Figure 9A:
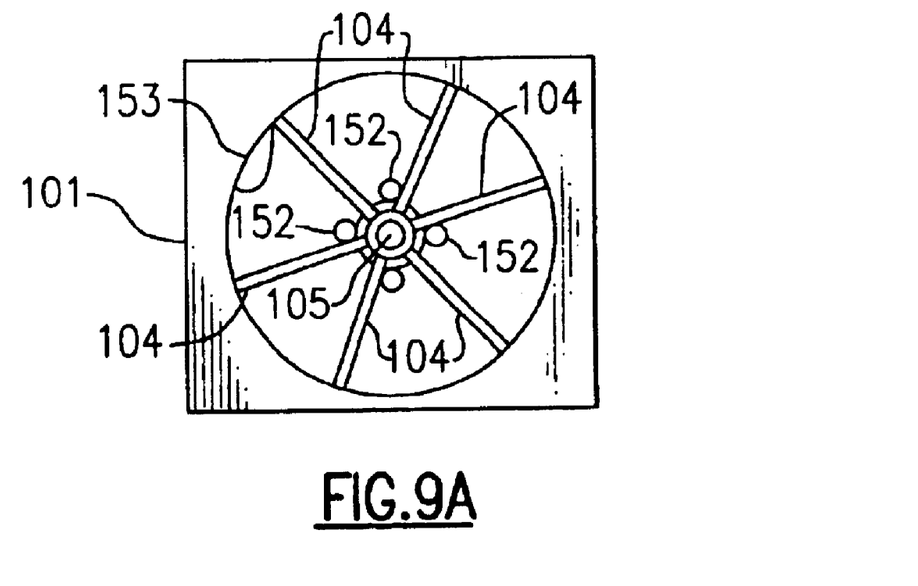
FIG. 9A is a top view of the basic building block of the stackable pump of the present invention.
Figure 9B:
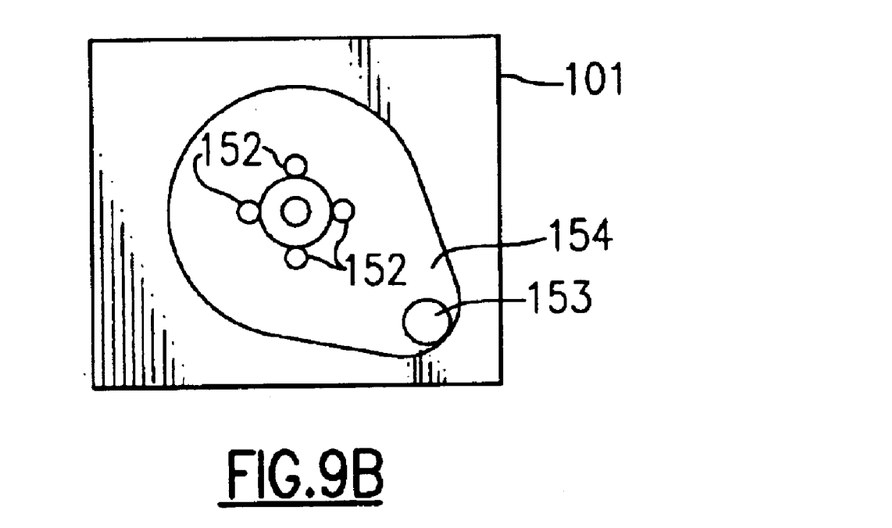
FIG. 9B is a bottom view of the basic building block of the stackable pump of the present invention.

FIGS. 9A and 9B depict top and bottom views of individual modular units 100 that are employable in a different embodiment of the present invention. In particular, in this embodiment the necessity for external fluid coupling between adjacent modular pump units is eliminated. Instead, as shown in FIG. 9A inlets 152 are provided in the bottom of modular unit housing 101. Fluid inlets 152 are preferably disposed in central locations adjacent to the hub to which vanes 104 are affixed. In this embodiment there is provided volume extension 154 to the opening in which vanes 104 are disposed. Volume extension 104 is in fluid communication with outlet 153 which provides a fluid connection to the adjacent pump module.

It is noted that, while the housing units shown herein are substantially in the shape of rectangular parallelepipeds, this shape is not critical. In terms of the shape of the modular pump stack as viewed from a direction along the axis of rotation of the vanes, any convenient shape may be provided and may be tailored to fit the needs of specific cooling or other applications. The important aspect of the housing units is that they have top and bottom surfaces which mate and which can be provided with a sealing mechanism, such as an O-ring or gasket seal. It is also noted that the use of the words "top" and/or "bottom" in the description of the present invention and in the claims is relative.

It is even further noted that a stackable pump assembly may be constructed in which the opening in the housing in which the vanes rotate is formed so as to extend completely from one side of the housing to the other, thus providing an opening extending all the way through the housing. In such cases sealing between the modular pump units is provided by a plurality of separate plates. If there are n modular pump units, there are therefore n+1 such plates: n−1 plates between the housing units plus a plate at each end. In this embodiment the pump is assembled in the following order:

bottom plate, housing, vanes, separating plate, housing, vanes, etc. until the last module with the top plate completing the structure. As above, in this embodiment the vanes may either be provided with a shafts having interlocking ends (the preferred approach) or include central openings for the receipt of a separate shaft. A separate shaft includes one or more surface features which match corresponding surface features in the central openings in the vane assembly. Typically, such a feature is supplied by a spline, spline-like or any other engagement that insures that rotation of the separate shaft provides rotation of the vane assemblies.

One of the objects of the present invention is to provide "in the field" configurability. However, it is noted that for some more well defined cooling scenarios, a more fixed pump solution is either desirable or acceptable. In such cases, the present invention may employ gasket and adhesive sealing to permanently bond one modular pump unit to its adjacent modular pump unit or units. While such an embodiment does not provide field configurability, it nonetheless provides manufacturing advantages and product line flexibility.

Housing 101 of the present invention may be made out of any convenient material that is compatible with the cooling fluid employed. In cases involving cooling electronic components, water is the preferred cooling fluid. However, it is possible to use other material compatible coolants such as ethylene glycol. Accordingly, housing 101 may comprise a polymeric material, metal or ceramic. Polymeric materials are preferred for the electronic application since they are easily machined or molded and are light weight and compatible with water as a cooling fluid.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A field configurable fluid pump comprising:
   a plurality of modular pump units each having a fluid inlet port and a fluid outlet port and a set of rotatable fluid moving vanes disposed within a substantially central volume of said pump unit, said pump units being sealed one against the other and arranged in a stack, whereby there is an uppermost pump unit in said stack;
   a drive shaft extending through said modular pump units and connected so as to rotate said vanes to move fluid from respective ones of said inlet ports to respective ones of said outlet ports;
   at least one removable fluid coupling conduit extending from one of said outlet ports to the inlet port in an adjacently disposed pump unit in said stack; and
   a sealing member disposed against said uppermost pump unit in said stack to provide a fluid seal for the substantially central volume of said uppermost pump unit.

2. The pump of claim 1 in which said sealing member comprises an unconnected modular pump unit.

3. The pump of claim 1 in which said sealing member comprises a flat plate.

4. The pump of claim 1 in which said modular pump units comprise a material selected from the group consisting of metal, plastic and ceramic.

5. The pump of claim 1 in which said vanes are affixed to separate axles which interlock with one another so as to comprise said drive shaft.

6. The pump of claim 1 in which said vanes are affixed to separate axles and in which said drive shaft comprises an integral structure separate from said rotatable vanes and which is disposed through a plurality of said axles so as to be able to rotate said vanes.

7. The pump of claim 1 in which there is one less removable fluid coupling conduit than there are modular pump units in said stack.

8. The pump of claim 1 in which said inlet port and said outlet port are disposed on the same side of said modular pump unit.

9. The pump of claim 1 in which said sealing is provided by an O-ring disposed in a channel on an upper surface of said modular pump unit.

10. The pump of claim 1 further including a biasing mechanism urging said modular pump units together to faciliate said sealing.

11. The pump of claim 10 in which said biasing mechanism is provided by a plurality of bolts extending through said stack and nuts for said bolts.

12. A modular pump unit comprising:
    a housing having a top side with a substantially centrally disposed opening on said top side, said opening defining a fluid flow volume, said housing including an inlet port in fluid communication with said volume and an outlet port in fluid communication with said volume;
    a set of rotatable vanes mounted on a drive axle which extends through a sealed opening in the bottom of said fluid flow volume, said vanes being rotatable with said fluid flow volume so as to move fluid from said inlet port to said outlet port; and
    a seal disposed on said top side of said housing so as to be capable of forming a seal with other modular pump units in a stacked configuration.

13. The modular pump unit of claim 12 in which said axle includes ends thereof which mate with corresponding axle portions in said stacked configuration.

14. The modular pump unit of claim 12 in which said unit comprises a material selected from the group consisting of metal, plastic and ceramic.

15. The modular pump unit of claim 12 in which said inlet port and said outlet port are disposed on the same side of said housing.

16. A fluid cooled electronic system comprising:
    an electronic component from which heat is to be removed;
    a cold plate in thermal contact with said electronic component, said cold plate having cooling fluid channels therein;
    at least one air-to-fluid heat exchanger;
    a fluid pump; and
    fluid connections forming a closed loop fluid path from said pump to said at least one heat exchanger, to said cold plate and back to said pump;
    wherein said fluid pump comprises a plurality of modular pump units in a sealed stack.

17. The fluid cooled electronic system of claim 16 in which said at least one heat exchanger is disposed immediately downstream of said pump.

18. The fluid cooled electronic system of claim 16 in which said cold plate is disposed immediately downstream of said pump.

19. The fluid cooled electronic system of claim 16 further including a cooling fluid.

* * * * *